UNITED STATES PATENT OFFICE.

KARL SCHIRMACHER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

AZO DYESTUFF.

1,045,196.  Specification of Letters Patent.  Patented Nov. 26, 1912.

No Drawing.  Application filed March 16, 1912. Serial No. 684,302.

*To all whom it may concern:*

Be it known that I, KARL SCHIRMACHER, Ph. D., chemist, a citizen of the Empire of Germany, residing at Höchst-on-the-Main, Germany, have invented certain new and useful Improvements in New Azo Dyestuffs, of which the following is a specification.

I have found that valuable azo dyestuffs are obtained by causing diazo compounds of aminosulfones of the aromatic series to act upon a 2-arylamino-8-oxynaphthalene-6-sulfonic acid. The dyestuffs thus obtained are dark-brown powders, difficultly soluble in water with a brown color, readily soluble in alkalis with a brown color, and dye wool brown tints remarkable for their great fastness to washing.

The constitution of the new dyestuffs corresponds to the formula:

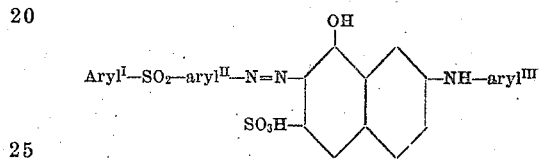

wherein aryl$^I$, aryl$^{II}$ and aryl$^{III}$ stand for aromatic residues, which may also be substituted. When treated with tin and hydrochloric acid, they are split up into an aromatic aminosulfone and 2-arylamino-7-amino-8-oxynaphthalenesulfonic acid; their alkali salts are readily soluble in water with a brown color.

The following example illustrates my invention: 24.7 parts by weight of m-amino-p-methyldiphenylsulfone:

obtainable by condensing p-toluenesulfochlorid with benzene and subsequently nitrating and reducing the condensation product, are diazotized with 40 parts of hydrochloric acid of 20° Bé. and 7 parts of nitrite; the diazo solution thus obtained is filtered and introduced into a solution of 32 parts of 2-phenylamino-8-oxynaphthalene-6-sulfonic acid and 40 parts of sodium carbonate. The coupling occurs rapidly with separation of the dyestuff; after heating for some time to 80–90° C. and adding some salt the dyestuff may be separated by filtration. When dry, it forms a brownish-black powder having the constitution:—

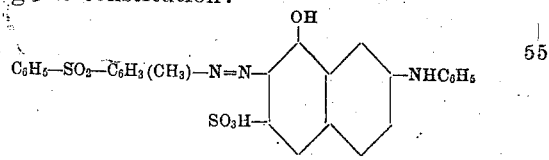

difficultly soluble in water, readily soluble in alkalis, splitting up on addition of tin and hydrochloric acid into m-amino-phenyl-p-tolylsulfone and 2-phenylamino-7-amino-8-oxynaphthalene-6-sulfonic acid, and dyeing directly wool fast brown tints.

Having now described my invention, what I claim is:

1. As new products, the azo dyestuffs, the constitution of which corresponds to the general formula:

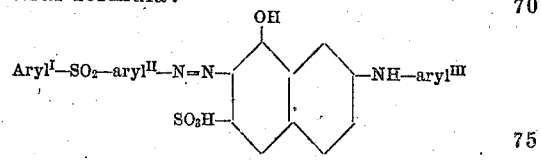

being dark-brown powders, difficultly soluble in water with a brown color, readily soluble in alkalis with a brown color, splitting up when treated with tin and hydrochloric acid into an aminodiarylsulfone and 2-arylamino-7-amino-8-oxynaphthalene-6-sulfonic acid.

2. As a new product, the azo dyestuff of the constitution:

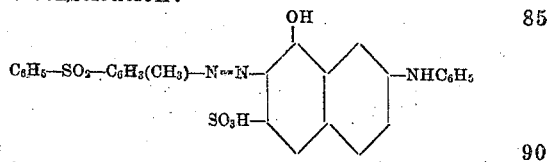

being a brownish-black powder, difficulty soluble in water, readily soluble in alkalis, splitting up on addition of tin and hydrochloric acid into m-amino-phenyl-p-tolylsulfone and 2-phenylamino-7-amino-8-oxynaphthalene-6-sulfonic acid.

In testimony whereof, I affix my signature in presence of two witnesses.

KARL SCHIRMACHER.

Witnesses:
 JEAN GRUND,
 CARL GRUND.